UNITED STATES PATENT OFFICE.

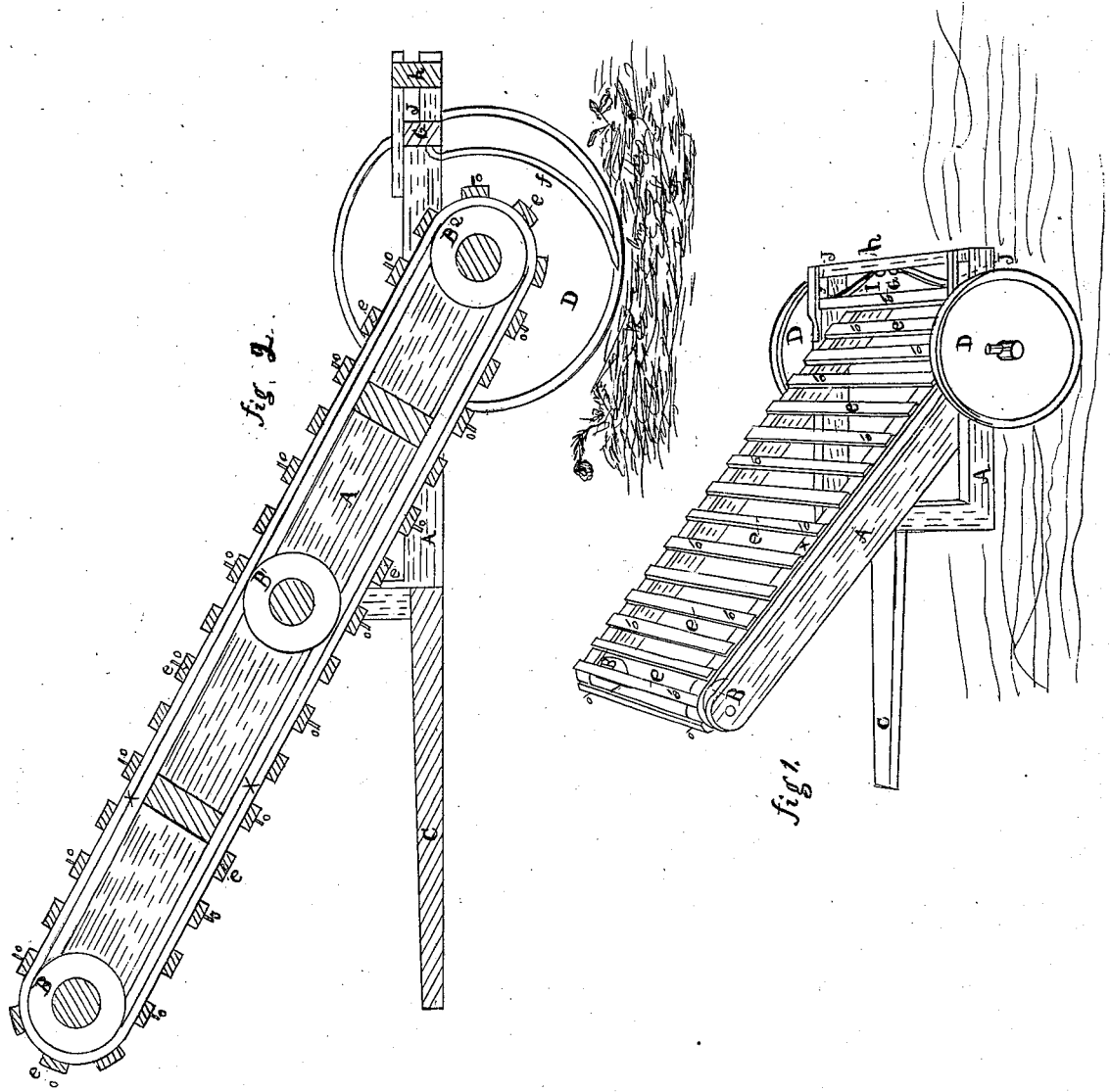

R. WRIGHT AND I. WRIGHT, OF FRANKLIN TOWNSHIP, ALLEGHENY COUNTY, PENNSYLVANIA.

IMPROVEMENT IN MACHINES FOR RAKING AND LOADING HAY.

Specification forming part of Letters Patent No. 59,116, dated October 23, 1866.

*To all whom it may concern:*

Be it known that we, ROBERT WRIGHT and ISAAC WRIGHT, of Franklin township, in the county of Allegheny and State of Pennsylvania, have invented a new and useful Improvement in Hay-Rake and Hay-Loading Machine; and we hereby declare the following to be a full and exact description thereof, reference being had to the accompanying drawings, and to the letters of reference marked thereon.

The nature of our invention consists in combining, with an endless apron armed with teeth, a yielding rake-head, said endless apron being arranged with relation to the rake and rake-head so that in their combined action they will rake the hay and convey it from the rake up into the hay-wagon, without liability of the hay becoming clogged and wedged between the rake and endless apron, the whole being constructed, arranged, and operating in the manner hereinafter described.

To enable others skilled in the art to make and use our invention, we will proceed to describe its construction and operation.

In the accompanying drawings, making part of our specification, Figure 1 represents a perspective view of our improved hay-rake and hay-loading machine. Fig. 2 represents a longitudinal section of the same.

In the drawings, A represents the frame of the machine, which is provided with pulleys B, B[1], and B[2], around which are placed belts $x$, to which are attached narrow strips of wood $e$, which are armed with teeth $o$.

To the axle or shaft of the pulleys B[2] are attached the driving-wheels D, which may, if desired, be arranged so that they will turn on said axle without turning the endless apron which elevates the hay up from the rake.

This arrangement of the driving-wheels can readily be effected by the use of suitable ratchets and pawls, or by means of other devices, which I leave to the good judgment and skill of the mechanic.

The rake-head $g$ is arranged in the slots J, in the back end of the frame A, and between the rake-head $g$ and the cross-bar $h$ is placed spring $i$, which is secured to the cross-bar $h$. This spring holds the rake-head and rake up to the work, and allows the rake and its head to yield to any undue strain brought on the rake while raking in heavy hay.

The rake consists of the head $g$ and tines $f$, which are made in any of the known forms, and are attached to the head-bar $g$ by any of the known means.

C represents the tongue of the machine, and is used for connecting it to the hay-wagon.

The operation of our improved rake and hay-loading machine is as follows: The tongue C of the machine is attached to the hay-wagon, and the motion of the hay-wagon will impart motion to the wheels D of the machine, and the motion of the wheels D will impart motion to the pulleys B[2], which will put in motion the endless apron, which will convey the hay up into the hay-wagon as fast as it is gathered by the rake, and in case the hay should have any tendency to clog or wedge between the endless apron and rake, the rake-head will yield and allow the teeth $o$ on the endless apron to convey the hay off without any undue strain upon the apron or rake.

Having thus described the nature, construction, and operation of our improvement, what we claim is—

The yielding rake-head $g$, in combination with an endless apron, when used for raking hay and conveying it up into the hay-wagon, in the manner herein described and set forth.

ROBERT WRIGHT.
ISAAC WRIGHT.

Witnesses:
JAMES J. JOHNSTON,
JAMES McBRIDE.